(12) United States Patent
Lipp

(10) Patent No.: US 7,943,854 B1
(45) Date of Patent: May 17, 2011

(54) WIRE TWIST OPTIMIZING GROMMET

(75) Inventor: Douglas C. Lipp, Canton, MI (US)

(73) Assignee: Yazaki North America, Canton, MI (US)

( * ) Notice: Subject to any disclaimer, the term of this patent is extended or adjusted under 35 U.S.C. 154(b) by 369 days.

(21) Appl. No.: 12/233,749

(22) Filed: Sep. 19, 2008

(51) Int. Cl.
*H02G 3/22* (2006.01)
*H01B 17/58* (2006.01)

(52) U.S. Cl. ............ 174/152 G; 174/153 G; 174/153 R; 16/2.1; 16/2.2

(58) Field of Classification Search .................. 174/650, 174/135, 152 G, 153 G, 152 R, 17 CT, 151, 174/142, 652, 656, 72 A, 665, 668, 669; 16/2.1, 16/2.2; 439/604, 587, 274, 275; 248/56
See application file for complete search history.

(56) References Cited

U.S. PATENT DOCUMENTS

| | | | |
|---|---|---|---|
| 5,448,017 A | 9/1995 | Nakajima et al. | |
| 5,716,044 A | 2/1998 | Peterson et al. | |
| 5,911,450 A * | 6/1999 | Shibata et al. | 174/72 A |
| 6,015,952 A | 1/2000 | Mori et al. | |
| 6,278,060 B1 | 8/2001 | Mori et al. | |
| 6,534,713 B2 | 3/2003 | Kafer et al. | |
| 6,844,497 B2 | 1/2005 | Frantz et al. | |
| 6,901,627 B2 * | 6/2005 | Uchida | 16/2.1 |
| 6,933,439 B2 | 8/2005 | Nishihara et al. | |
| 7,020,931 B1 | 4/2006 | Burnett et al. | |
| 7,053,304 B2 | 5/2006 | Ojima et al. | |
| 7,053,305 B2 | 5/2006 | Takase et al. | |
| 7,053,311 B2 | 5/2006 | Santanda et al. | |
| 7,098,402 B2 | 8/2006 | Suzuki et al. | |
| 7,244,894 B1 | 7/2007 | Lipp | |
| 7,297,874 B2 * | 11/2007 | Yasuda et al. | 174/72 A |
| 7,423,223 B2 * | 9/2008 | Taira | 174/650 |
| 7,659,480 B2 * | 2/2010 | Bikhleyzer | 174/153 G |

* cited by examiner

*Primary Examiner* — Angel R Estrada
(74) *Attorney, Agent, or Firm* — Harness, Dickey & Pierce, P.L.C.

(57) ABSTRACT

A grommet for routing wires between a relatively stationary body and a hinged panel can include a first sealing end and a second sealing end. Two bellows segments can extend between the first and second sealing ends. The bellows segments can be linked by an intermediate portion. A retainer can include a first element having a means for attachment to the intermediate portion and a second element having a means for attachment to the second sealing end of the grommet. The first and second elements can have complementary latch features opposite the attachment means, such that the first and second elements directly connect to each other in a connected position. One of the two bellows segments can be bent between the intermediate portion and the second sealing end of the grommet bringing the intermediate portion into close proximity with the second sealing end.

20 Claims, 5 Drawing Sheets

US 7,943,854 B1

WIRE TWIST OPTIMIZING GROMMET

FIELD

The present disclosure relates to a configuration and method for routing electrical wires from a stationary body to a panel hingedly connected to the stationary body.

BACKGROUND

The statements in this section merely provide background information related to the present disclosure and may not constitute prior art.

In some instances, it may be necessary to route electrical wires from stationary bodies (such as a body panel of a vehicle) to hinged panels (such as a door of a vehicle). In some examples, the electrical wires can extend through a first opening defined in the stationary body and pass through a second opening formed in the hinged panel. In general, the optimal path for passing such electrical wires across hinged openings is to align a portion of the wire path with an axis defined by the hinge. The longer this path is, the more likely the wires will twist along their axis, with the action of the hinge, instead of bending. Electrical wires subjected to repeated bending are much more likely to break than wires that are subjected to repeated twisting. In some instances, however, the physical space (between the first and second openings) can be constrained, such that the ability to route the wires along an optimal path is limited.

SUMMARY

A grommet for routing wires between a relatively stationary body and a hinged panel can include a first sealing end and a second sealing end. Two bellows segments can extend between the first and second sealing ends. The bellows segments can be linked by an intermediate portion. A retainer can include a first element having a means for attachment to the intermediate portion and a second element having a means for attachment to the second sealing end of the grommet. The first and second elements can have complementary latch features opposite the attachment means, such that the first and second elements directly connect to each other in a connected position. One of the two bellows segments can be bent between the intermediate portion and the second sealing end of the grommet bringing the intermediate portion into close proximity with the second sealing end.

The grommet can further comprise a flexible tether that joins the first and second elements of the retainer. The first sealing end can comprise a first elastomeric mounting portion. The second sealing end can comprise a second elastomeric mounting portion. At least one of the first and second elastomeric mounting portions can define a cylindrical sidewall having a channel formed thereon. The two bellows segments and the intermediate portion can collectively define a continuous cannulated flexible member.

According to other features, in the connected position, the continuous cannulated flexible member can define a first substantially linear section that extends from the first sealing end, a second substantially linear section that extends from the second sealing end and a U-shaped section extending between the first and second sealing ends. In the connected position, the second sealing end can occupy an elevation between the first sealing end and the U-shaped section. A first distance can be defined between the first sealing end and a lowermost portion of the U-shaped section. The first distance can be substantially about three inches. The continuous cannulated flexible member can define a total length having a first distance from the first sealing end to the second sealing end. In the connected position, the first and second sealing ends can be offset a second distance. The second distance can be less than the first distance.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Example embodiments will now be described more fully with reference to the accompanying drawings.

Figure 1:
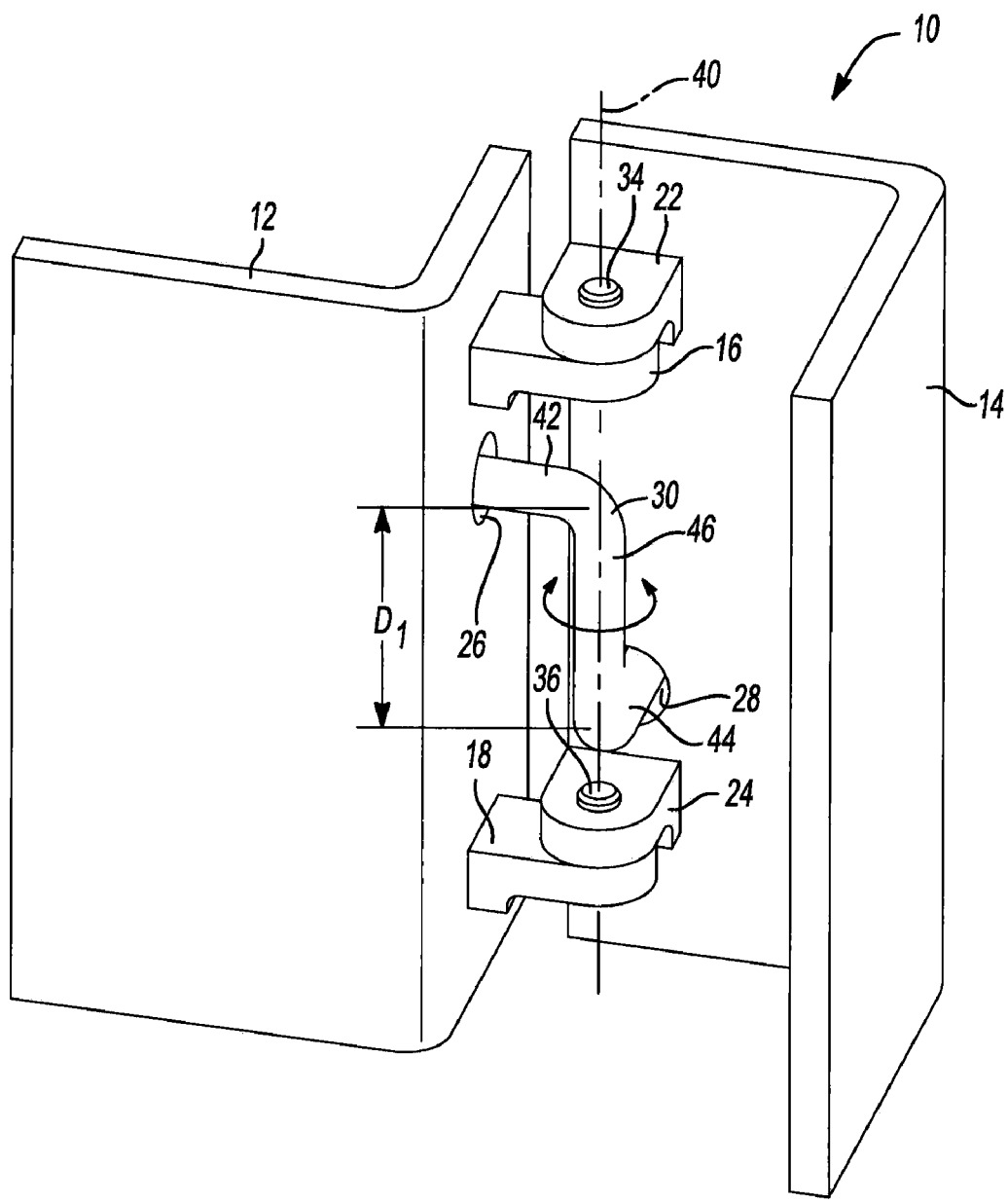
FIG. 1 is a perspective view of exemplary electrical wires passing between openings formed in a stationary body and a hinged panel according to one example of prior art.

With initial reference to FIG. 1, an exemplary mounting arrangement for electrical wires according to prior art is shown and generally identified at reference numeral 10. The exemplary mounting arrangement 10 generally comprises a stationary body 12 and a hinged panel 14. The stationary body 12 can include a first and a second hinge portion 16 and 18, respectively. The hinged panel 14 can include a first and a second hinge portion 22 and 24, respectively. The stationary body 12 can define a first opening 26. The hinged panel 14 can define a second opening 28. Electrical wires, collectively referred to at reference 30, can pass through the first opening 26 of the stationary body 12 on a first end and through the second opening 28 of the hinged panel 14 on an opposite end. The hinge portion 16 of the stationary body 12 can align with the hinge portion 22 of the hinge panel 14 for receiving a hinge pin 34. Similarly, the hinge portion 18 of the stationary body 12 can align with the hinge portion 24 of the hinged panel 14 to receive a pin 36. In one example, the pins 34 and 36 can align to define a hinge axis 40.

In an installed position, the electrical wires 30 can generally form a first segment 42 that passes through the first opening 26 and a second segment 44 that passes through the second opening 28. An intermediate segment 46 can extend between the first and second segments 42 and 44, respectively. In general, the intermediate segment 46 is aligned in a coaxial position relative to the axis 40. In the example shown in FIG. 1, a distance D1 is defined along the axis 40 from a center point of the first opening 26 to a center point of the second opening 28. As can be appreciated by those skilled in the art, as D1 becomes greater, the length of the intermediate segment 46 likewise becomes greater. The greater the length of the intermediate segment 46 extends along the axis 40, the exposure of the electrical wires 30 to bending is reduced. As used herein, the term "bending" is used to refer to movement of the electrical wires from a generally straight form into a generally curved or angular form.

As will become appreciated by the following discussion, the present disclosure provides a mounting arrangement for electrical wires that inhibits bending of the electrical wires during normal use of the hinged panel 14 (i.e., such as when the hinged panel 14 is rotated about the axis 40). The present disclosure is more particularly advantageous in applications where respective openings, such as the first and second openings 26 and 28, are relatively close. For exemplary purposes, the mounting arrangement 10 provided in FIG. 1 can define a distance D1 that the intermediate segment 46 extends along. According to one example, a satisfactory or desired distance of D1 can be at least about 3 inches. It is appreciated that other dimensions are contemplated. As will be described herein, the mounting arrangement according to the present teachings can be adapted for use in examples where the first opening 26 and the second opening 28 are spaced apart (i.e., a distance laterally from their respective centerlines) a distance that is less than D1.

Figure 2:
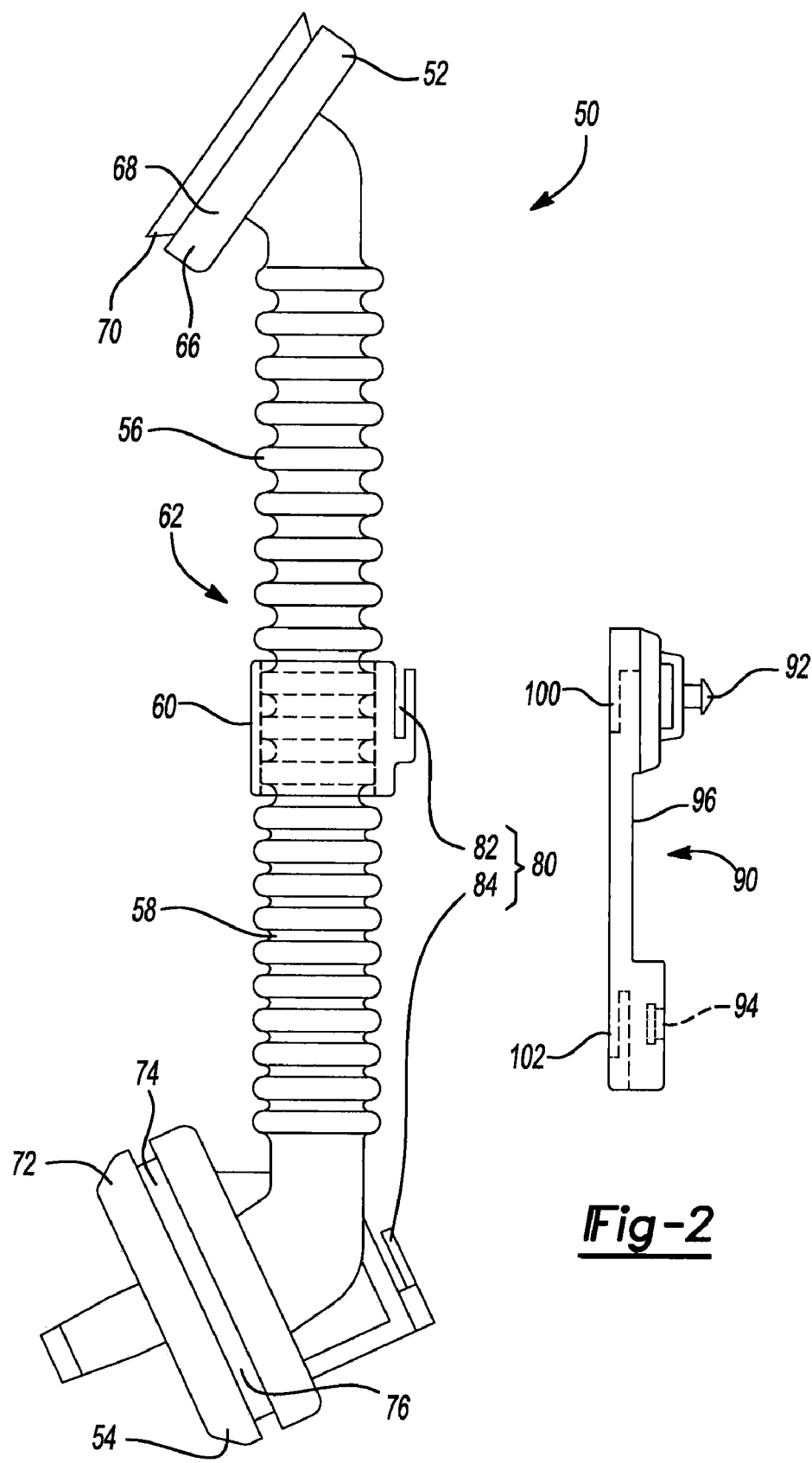
FIG. 2 is a plan view of an exemplary grommet and tether constructed in according with one example of the present teachings.

Turning now to FIG. 2, an exemplary grommet constructed in accordance with the present teachings for routing wires (such as the electrical wires 30, FIG. 1) is shown and generally identified at reference numeral 50. The grommet 50 can generally include a first sealing end 52, a second sealing end 54, a first bellows segment 56, a second bellows segment 58 and an intermediate portion 60. The first bellows segment 56, second bellows segment 58 and the intermediate portion 60 can collectively define a continuous, cannulated, flexible member 62. As can be appreciated, electrical wires can be configured to pass through the continuous, flexible, cannulated member 62. The first sealing end 52 can define a first elastomeric mounting portion 66. The first elastomeric mounting portion 66 can define a cylindrical sidewall 68 that defines a channel 70 formed therearound. The second sealing end 54 can define a second elastomeric mounting portion 72. The second elastomeric mounting portion 72 can define a cylindrical sidewall 74 that defines a second channel 76. In one example, the respective channels 70 and 76 can be configured to cooperate with respective openings (such as the first and second openings 26 and 28, FIG. 1) defined in a first stationary body (such as 12, FIG. 1) and a hinged panel (such as 14, FIG. 1) in an installed position.

The grommet 50 can further comprise a retainer, collectively referred to at reference numeral 80. The retainer 80 can be more specifically defined by a first retaining element 82 defined generally proximate to the intermediate portion 60 and a second retaining element 84 defined generally proximate to the second sealing end 54. As will be described, the retainer 80 is configured to selectively couple with a flexible tether 90.

With continued reference to FIG. 2, the flexible tether 90 will be described in greater detail. The flexible tether 90 can generally define a first connecting end 92, a second connecting end 94 and a bridge portion 96 that extends between the respective first and second connecting ends 92 and 94. In one example, the first and second connecting ends 92 and 94 and the bridge 96 can be integrally formed or monolithic. The flexible tether 90 can also define a first attachment portion 100 and a second attachment portion 102. In one example, the first attachment portion 100 can be formed on a common side of the tether 90 with the second attachment portion 102. The first attachment portion 100 is configured to selectively couple with the first retaining element 82 of the grommet 50. Similarly, the second attachment portion 102 is configured to selectively couple with the second retaining element 84 of the grommet 50. In addition, the first connecting end 92 of the flexible tether 90 is selectively coupled with the second retaining element 84 of the grommet 50. In addition, the first connecting end 92 of the flexible tether 90 is configured to selectively couple with the second connecting end 94 of the flexible tether 90.

Those skilled in the art will readily appreciate that the first retaining element 82 and the first attachment portion 100 can be configured as any suitable members or devices that can selectively couple with each other. Similarly, the second retaining element 84 and the second attachment portion 102 can be configured as any suitable arrangement capable of selectively coupling with each other. Likewise, the first connecting end 92 and the second connecting end 94 can be configured in any suitable manner that provides selectable coupling with each other. Exemplary coupling arrangements for any of the above components can include, but is not limited to, snaps, push-pins, Christmas tree fasteners, hook-and-loop fasteners (Velcro®), arrowhead fasteners, slide-fit fasteners, snap-fit fasteners, adhesive fastening, and others. It is further appreciated that supplemental fasteners, such as screws, clamps, etc., can also be incorporated for attachment of respective components.

Figure 3:
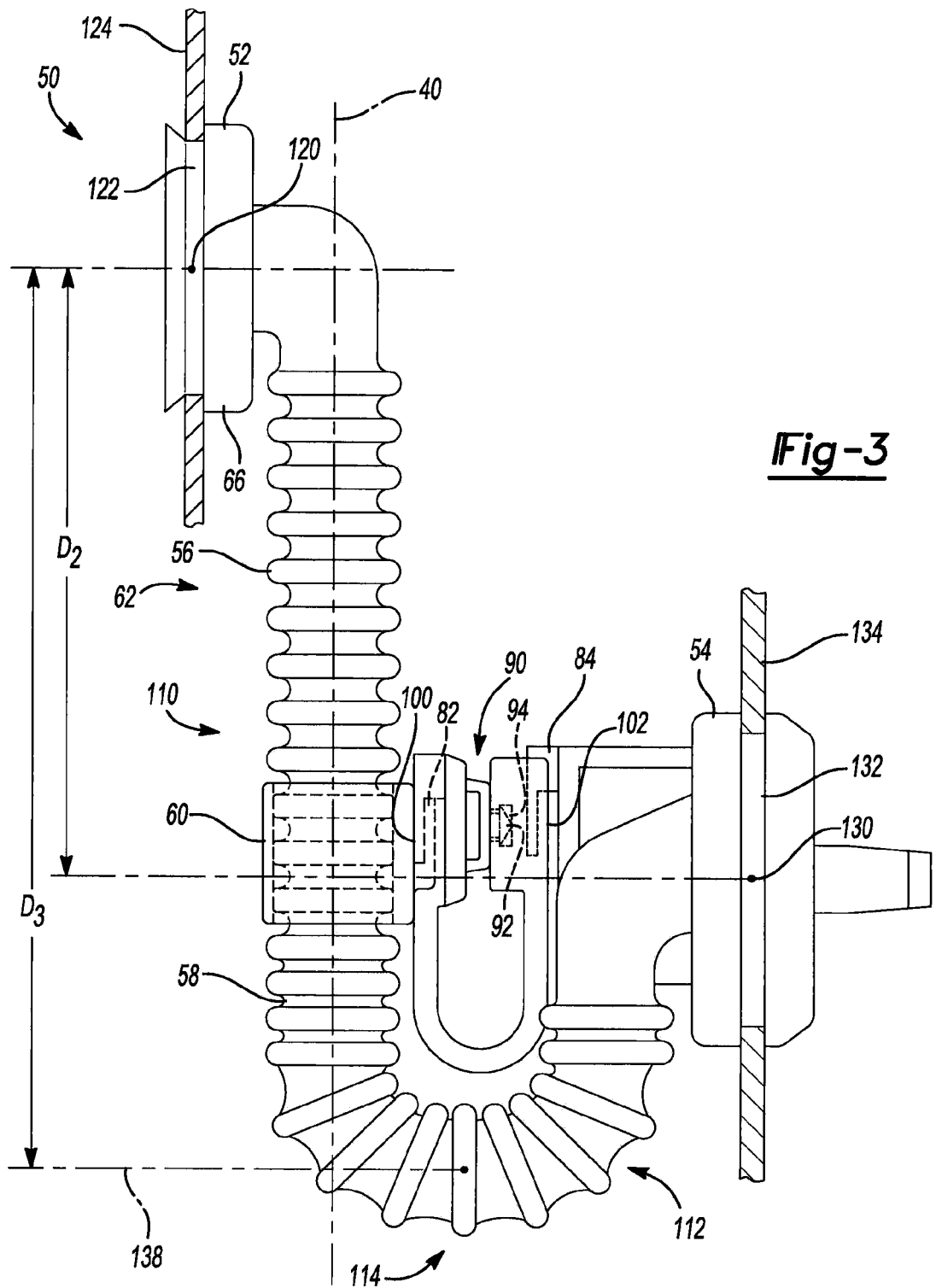
FIG. 3 is a side view of the exemplary grommet shown in FIG. 2 and illustrated in an installed position between an exemplary stationary body and hinged panel according to one example of the present teachings.

Turning now to FIG. 3, the grommet 50 is shown in an exemplary installed position. As illustrated, the first retaining element 82 is selectively coupled to the first attachment portion 100 of the flexible tether 90. The second retaining element 84 is selectively coupled with the second attachment portion 102 of the flexible tether 90. Furthermore, the respective first and second connecting ends 92 and 94 of the flexible tether 90 are coupled to each other. In the assembled position, the continuous flexible member 62 generally defines a first linear portion 110, a second linear portion 112, and a U-shaped section 114 extending between the respective first and second linear portions 110 and 112.

In the installed position, a distance D2 is defined from the first sealing end 52 to the second sealing end 54. More specifically, the distance D2 can be defined from a center point 120 of an opening 122 defined in a stationary body 124 to a center point 130 of an opening 132 defined in a hinged panel 134. In this example, D2 is less than D1 (FIG. 1). A distance D3 can be defined generally from the first sealing end 52 to a lowermost portion of the U-shaped portion 114. More specifically, the distance D3 can be defined from the center point 120 of the opening 122 to a center line 138 of the flexible member 62 at the lowermost portion of the U-shaped portion 114. The grommet 50 can be configured such that the distance D3 is at least as long as the desired distance (D1, FIG. 1). As shown, the distance D3 is greater than the distance D2. According to the present teachings, the grommet 50 effectively lengthens a linear path that the electrical wires must extend through the flexible member 62.

Figure 4:
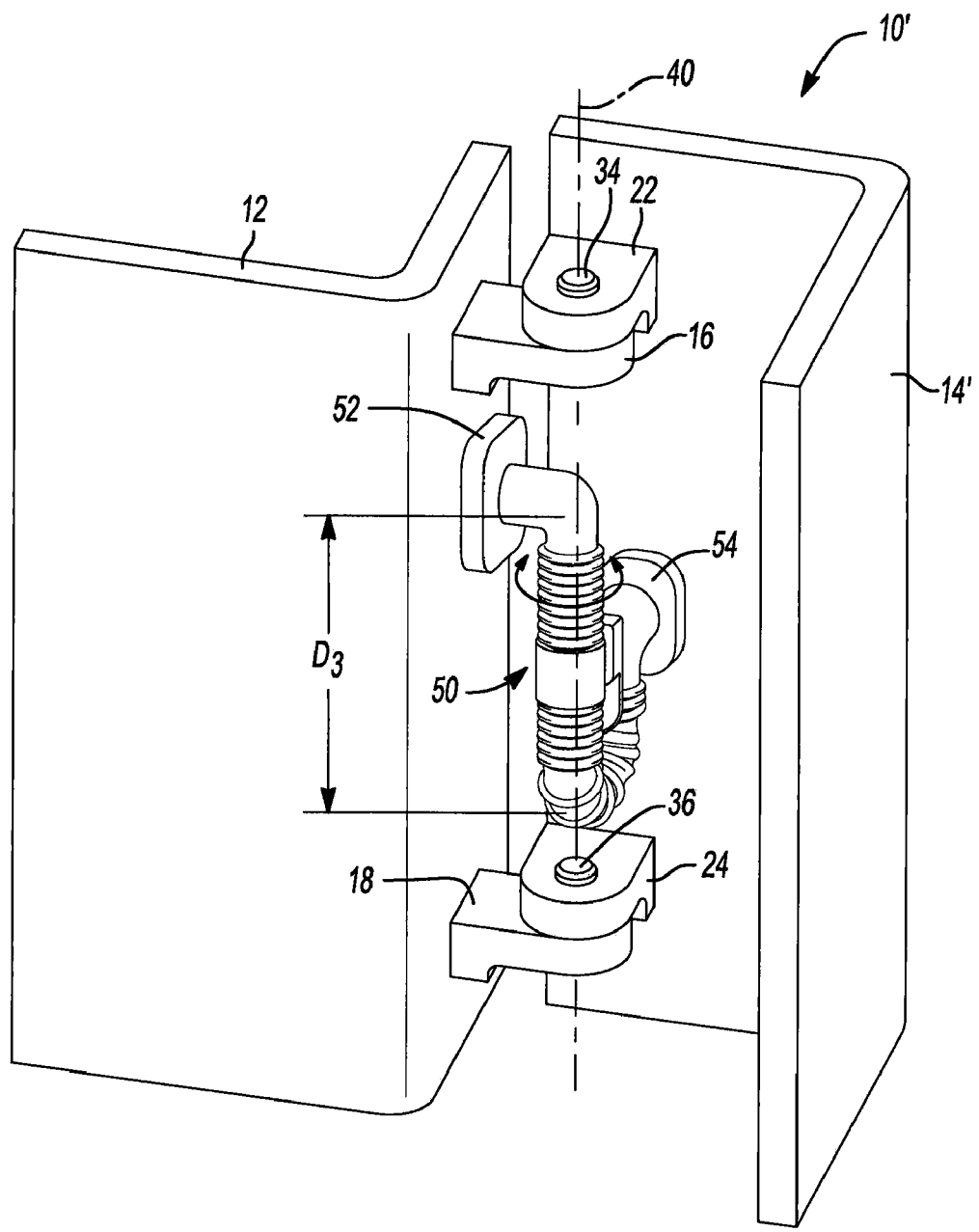
FIG. 4 is a perspective view of the exemplary grommet shown in FIG. 3 installed between the stationary body and hinged panel.

FIG. 4 illustrates the grommet 50 installed between a stationary member 12 and a hinged panel 14'. The hinged panel 14' defines an opening for receiving the second sealing end 54 that is raised (closer in lateral offset from the first sealing end 52) compared to the opening 28 shown in FIG. 1.

Those skilled in the art will readily appreciate that the grommet 50 can be configured in any manner consistent to any given application. Explained differently, a grommet 50 can be provided that requires a first linear portion having any desired length. Likewise, a grommet 50 can be provided that provides a second linear portion 112 that provides any desired length. It is further appreciated that the first retaining element 82 can be formed at any location along the flexible member 62. Likewise, the second retaining element 84 can be formed at any location along the flexible member 62 and/or the first and second sealing ends 52 and 54. The flexible tether 90 can be configured to have any length.

Figure 5:
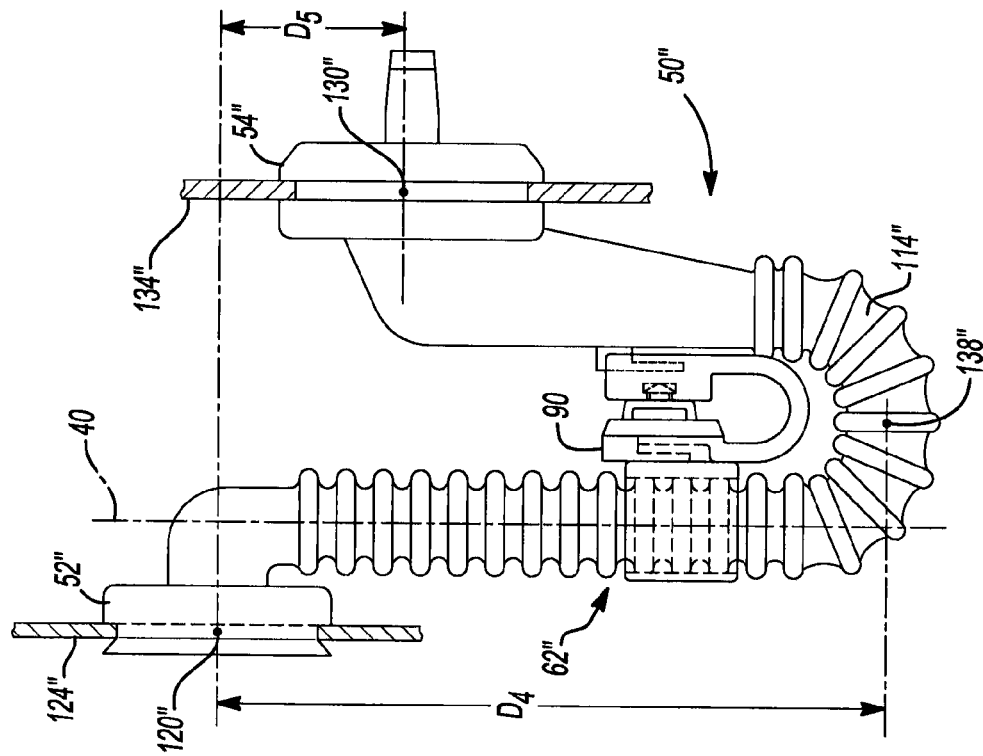
FIG. 5 is a side view of another exemplary grommet constructed in accordance to additional features and shown installed between a stationary body and hinged panel.
Figure 6:
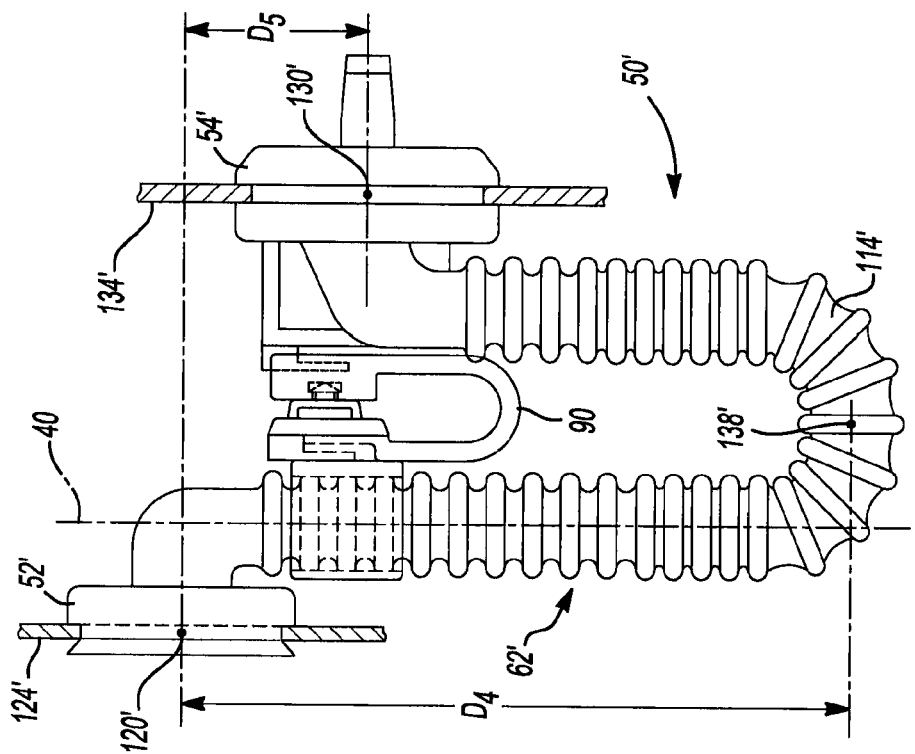
FIG. 6 is another grommet according to additional features of the present teachings and shown between a stationary body and hinged panel.

To further illustrate other applications of the instant disclosure, a grommet 50' is shown in FIG. 5 installed between a stationary body 124' and a hinged panel 134'. A distance D4 can be defined between a center point 120' of the opening of the stationary body 124' and a center line 138' of the flexible member 62'. The distance D4 can be configured to be at least as long as the desired distance (D1, FIG. 1). A distance D5 can be defined between the center point 120' of the first sealing end 52' and a center point 130' of the second sealing end 54'. As shown in FIG. 6, a grommet 50" is shown connected between a stationary panel 124" and a hinged panel 134". A distance D6 can be defined between a center point 120" of the opening of the stationary body 124" and a center line 138" of the flexible member 62" at the lowermost portion of the U-shaped portion 114". The distance D6 can be configured to be at least as long as the desired distance (D1, FIG. 1). In the exemplary grommet 50" shown in FIG. 6, the center points 120" and 130" can be equivalent or substantially equivalent. It is appreciated that the exemplary grommets 50' and 50" shown and described above with respect to FIGS. 5 and 6, can be configured with like components and features of the grommet 50'. In the example shown in FIG. 6, the tether 90 is not included. As can be appreciated, the tether 90 is optional in all exemplary configurations.

An exemplary method of installing the grommet 50 according to a first example of the present teachings will now be described. At the outset, a user can install the first sealing end 52 of the grommet 50 into the stationary body 124. Secondly, a user can selectively couple the respective first and second connecting ends 92 and 94 of the flexible tether 90 together. The second sealing end 54 can then be installed into the opening 132 of the hinged member 134. In some examples, it may be required to also selectively attach the first attachment portion 100 of the flexible tether 90 to the first retaining element 82 of the grommet 50. Similarly, the second attachment portion 102 can be selectively coupled to the second retaining element 84 of the grommet 50. Those skilled in the art will readily appreciate that the steps described above in the exemplary method do not need to be sequential. In this way, many of the steps can be switched in order. For example, the second sealing element 54 may be selectively affixed to the hinged member 134 prior to attaching the first sealing end 52 to the stationary member 124.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "connected to" or "coupled to" another element or layer, it may be directly on, engaged, connected or coupled to the other element or layer, or intervening elements or layers may be present.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A grommet for routing wires between a relatively stationary body and a hinged panel, the grommet comprising:
   a first sealing end;
   a second sealing end;
   two bellows segments extending between the first and second sealing ends, the bellows segments being linked by an intermediate portion; and
   a retainer including a first element having a means for attachment to the intermediate portion and a second element having a means for attachment to the second sealing end of the grommet, the first and second elements having complementary latch features opposite the attachment means such that the first and second elements directly connect together in a connected position, bending one of the two bellows segments between the intermediate portion and the second sealing end of the grommet and bringing the intermediate portion into close proximity with the second sealing end.

2. The grommet of claim 1 further comprising a flexible tether joining the first and second elements of the retainer.

3. The grommet of claim 1 wherein the first sealing end comprises a first elastomeric mounting portion and wherein the second sealing end comprises a second elastomeric mounting portion.

4. The grommet of claim 3 wherein at least one of the first and second elastomeric mounting portions defines a cylindrical sidewall having a channel formed thereon.

5. The grommet of claim 1 wherein the two bellows segments and the intermediate portion collectively define a continuous cannulated, flexible member.

6. The grommet of claim 5 wherein in the connected position, the continuous cannulated flexible member defines a first substantially linear section extending from the first sealing end, a second substantially linear section extending from the second sealing end and a U-shaped section extending between the first and second sealing ends.

7. The grommet of claim 6 wherein in the connected position the second sealing end occupies an elevation between the first sealing end and the U-shaped section.

8. The grommet of claim 7 wherein a first distance is defined between the first sealing end and a lowermost portion of the U-shaped section, the first distance being substantially about 3 inches.

9. The grommet of claim 5 wherein the continuous cannulated flexible member defines a total length having a first distance from the first sealing end to the second sealing end and wherein in the connected position the first and second sealing ends are offset a second distance, wherein the second distance is less than the first distance.

10. A grommet for routing wires between a relatively stationary body and a hinged panel, the grommet comprising:
   a first sealing end;
   a second sealing end;
   a continuous cannulated flexible member connected to and extending between the first and second sealing ends, respectively; and
   a retainer coupled between first and second portions of the continuous cannulated flexible member in a connected position, wherein in the connected position, the continuous cannulated flexible member defines a first substantially linear section extending from the first sealing end, a second substantially linear section extending from the second sealing end, and a U-shaped section extending between the first and second sealing ends, wherein the retainer is coupled at the first and second substantially linear sections of the continuous cannulated flexible member causing a portion of the continuous cannulated flexible member to bend at the U-shaped section while bringing a portion of the first substantially linear section in close proximity to the second sealing end.

11. The grommet of claim 10 wherein the continuous cannulated flexible member is further defined by two bellows segments extending between the first and second sealing ends, the bellows segments being linked by an intermediate portion.

12. The grommet of claim 11 wherein the retainer further includes a first element having a means for attachment to the intermediate portion and a second element having a means for attachment to the second sealing end of the grommet, the first and second elements having complementary latch features opposite the attachment means such that the first and second elements directly connect together in a connected position, bending one of the two bellows segments between the intermediate portion and the second sealing end of the grommet and bringing the intermediate portion into close proximity with the second sealing end.

13. The grommet of claim 10, further comprising a flexible tether joining the first and second elements of the retainer.

14. The grommet of claim 10 wherein the first sealing end comprises a first elastomeric mounting portion and wherein the second sealing end comprises a second elastomeric mounting portion.

15. The grommet of claim 14 wherein at least one of the first and second elastomeric mounting portions defines a cylindrical sidewall having a channel formed thereon.

16. The grommet of claim 10 wherein in the connected position the second sealing end occupies an elevation between the first sealing end and the U-shaped section.

17. The grommet of claim 16 wherein a first distance is defined between the first sealing end and a lowermost portion of the U-shaped section, the first distance being substantially about 3 inches.

18. The grommet of claim 10 wherein the continuous cannulated flexible member defines a total length having a first distance from the first sealing end to the second sealing end and wherein in the connected position the first and second sealing ends are offset a second distance, wherein the second distance is less than the first distance.

19. A grommet for routing wires between a relatively stationary body and a hinged panel, the grommet comprising:
   a first sealing end;
   a second sealing end;
   two bellows segments extending between the first and second sealing ends, the bellows segments being linked by an intermediate portion;
   a retainer including a first element having a means for attachment to the intermediate portion and a second element having a means for attachment to the second sealing end of the grommet, the first and second elements having complementary latch features opposite the attachment means such that the first and second elements directly connect together in a connected position, bending one of the two bellows segments between the intermediate portion and the second sealing end of the grommet and bringing the intermediate portion into close proximity with the second sealing end; and
   a flexible tether joining the first and second elements of the retainer, wherein the two bellows segments and the intermediate portion collectively define a continuous cannulated flexible member, wherein in the connected position, the continuous cannulated flexible member defines a first substantially linear section extending from the first sealing end, a second substantially linear section extending from the second sealing end and a U-shaped section extending between the first and second sealing ends, wherein in the connected position the second sealing end occupies an elevation between the first sealing end and the U-shaped section.

20. The grommet of claim 19 wherein the continuous cannulated flexible member defines a total length having a first distance from the first sealing end to the second sealing end and wherein in the connected position the first and second sealing ends are offset a second distance, wherein the second distance is less than the first distance.

* * * * *